UNITED STATES PATENT OFFICE.

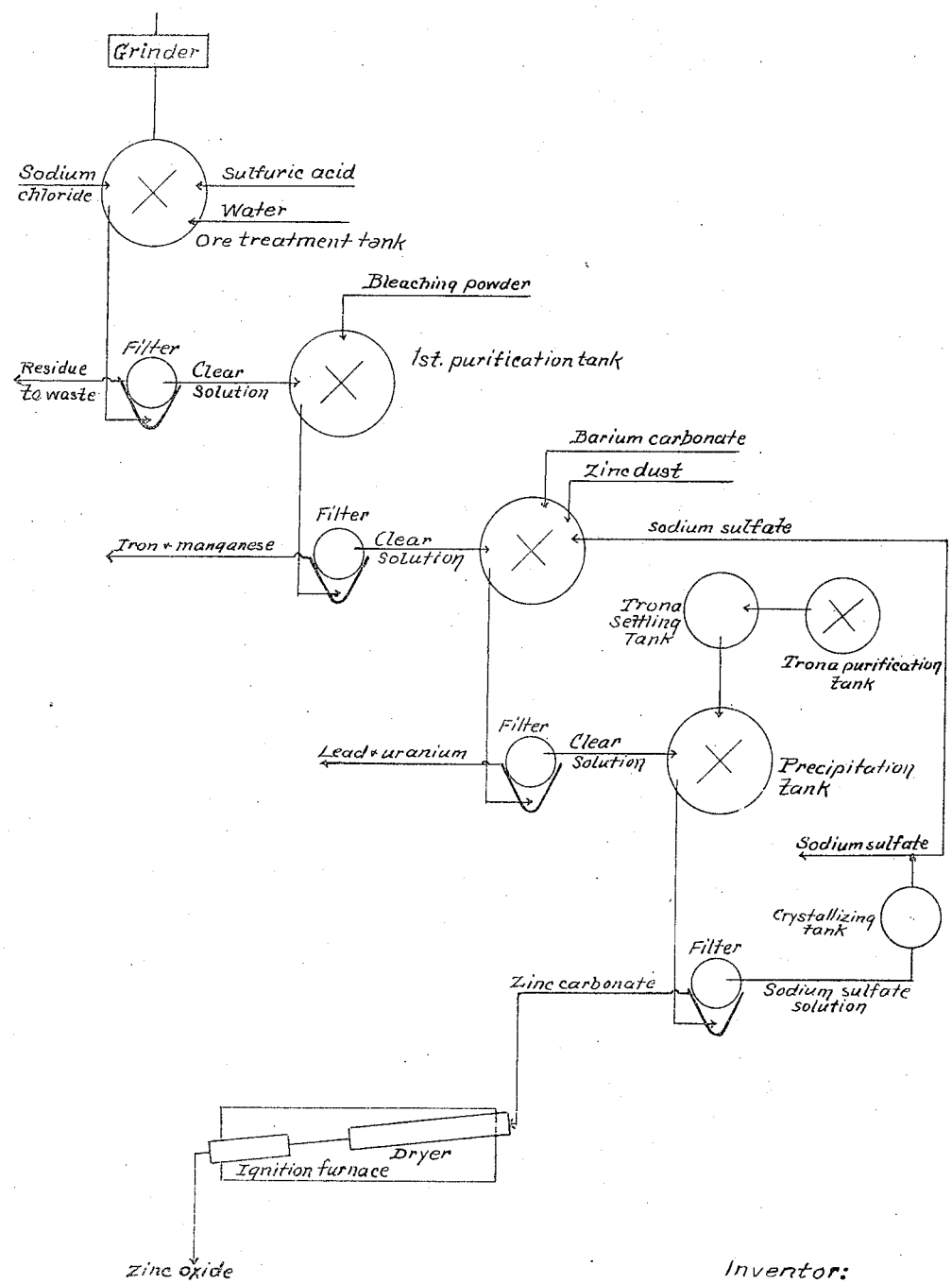

JOHN ALLINGHAM, OF LOS ANGELES, CALIFORNIA.

PROCESS FOR THE MANUFACTURE OF ZINC OXID DIRECT FROM OXIDIZED ZINC ORES.

1,380,515. Specification of Letters Patent. Patented June 7, 1921.

Application filed November 12, 1919. Serial No. 337,555.

*To all whom it may concern:*

Be it known that I, JOHN ALLINGHAM, a subject of the King of Great Britain and Ireland, and a resident of Los Angeles, in the county of Los Angeles, State of California, have invented a new and useful Process for the Manufacture of Zinc Oxid Direct from Oxidized Zinc Ores, of which the following is a specification.

The main object of the present invention is to produce zinc oxid substantially pure and white, directly from oxidized ores of zinc. Such oxidized ores may consist of the product of roasting zinc sulfid ore in the usual manner, or may be naturally occurring oxidized ores.

My process consists in the leaching of the zinc by a suitable solvent, namely, sulfuric acid and sodium chlorid solution, purifying the resulting solution, treating the solution with a solution of trona (a composition of normal and acid sodium carbonates) to precipitate zinc carbonate and separating the resulting precipitate. My invention further comprises treating the solution, in the purification referred to, with sodium sulfate produced in the final precipitation, to eliminate any of the lime present, if any.

The accompanying drawing is a flow sheet of the preferred method of carrying out my invention.

The ore is ground to pass 60 mesh, or such mesh as will give the most economical result, and is then agitated (in a tank provided with a mechanical stirrer) with the solvent. This solvent is a mixture of water, sulfuric acid and salt and is previously prepared. The amount of sulfuric acid and salt varies according to the amount of zinc and of lime present in the ore, but in practice, with ore containing about 25% of Zn and from 15 to 20% of CaO, I use per ton of ore about one thousand pounds of sulfuric acid, about twelve hundred pounds of sodium chlorid and three to four tons of water.

After solution of the zinc has taken place, care being taken that there is practically no free acid left, the pulp is filtered through any standard filter suitable for the purpose, and the resulting residue is washed with water to displace any solution contained therein.

In mixing the solvent above referred to, reaction takes place as follows:

$$H_2SO_4 + NaCl = Na_2SO_4 + 2HCl$$

so that the solution contains sodium sulfate and hydrochloric acid.

Any lime dissolved as chlorid is precipitated as calcium sulfate by the sodium sulfate present, according to the equation:

$$CaCl_2 + Na_2SO_4 = 2NaCl + CaSO_4$$

therefore it is necessary that the zinc and lime content should be adjusted so that the lime dissolved should be sufficient to react with the sodium sulfate formed within practical limits.

The resulting filtered solution is then treated hot with bleaching powder to remove such impurities as iron and manganese, and again filtered.

Again the filtered solution is treated with finely ground barium carbonate and zinc dust to remove lead, uranium, etc. In case calcium salts are present in the solution sodium sulfate may be added to precipitate the same.

The purified solution is then treated with a solution of trona, which has been purified, to precipitate the zinc as zinc carbonate, according to the equation:

$$ZnSO_4 + Na_2CO_3 = ZnCO_3 + Na_2SO_4$$
$$ZnSO_4 + 2NaHCO_3 = ZnCO_3 + CO_2 + H_2O$$

The carbonate is filtered off and dried and ignited to oxid.

The filtration of the solution is performed in standard filtering apparatus.

The filtrate containing sodium sulfate is evaporated down and the sodium sulfate crystallized out. Part of the sodium sulfate so produced may be added in the second purification above referred to to precipitate most of the lime present (if any).

What I claim is:

The process of making zinc oxid direct from oxidized ores, which consists in subjecting such ore to the solvent action of a solution of sulfuric acid and sodium chlorid, separating the resulting solution from the residue, treating the solution to remove compounds of metals other than zinc, treating the solution with trona to precipitate zinc as carbonate, separating the zinc carbonate from the solution, drying and igniting the zinc carbonate, treating the solution from which the zinc carbonate has been removed to recover sodium sulfate and adding part of such sodium sulfate to the solution produced in cyclic operation of the process by solvent action on the ore, to remove lime from such solution.

In testimony whereof I have hereunto subscribed my name this 21st day of October, 1919.

JOHN ALLINGHAM.